US012292726B2

(12) United States Patent
Jensen et al.

(10) Patent No.: US 12,292,726 B2
(45) Date of Patent: *May 6, 2025

(54) LEVEL SENSOR FOR CONTINUOUS LEVEL DETECTION AND INTEGRATION INTO PROCESS CONTROL SYSTEM

(71) Applicant: FISHER CONTROLS INTERNATIONAL LLC, Marshalltown, IA (US)

(72) Inventors: Kurtis K. Jensen, Marshalltown, IA (US); Andrew M. Prusha, Marshalltown, IA (US); Joseph F. DeMonte, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,376

(22) Filed: Oct. 20, 2023

(65) Prior Publication Data

US 2024/0045397 A1  Feb. 8, 2024

Related U.S. Application Data

(62) Division of application No. 17/208,398, filed on Mar. 22, 2021, now Pat. No. 11,809,157.

(51) Int. Cl.
*G01F 23/36* (2006.01)
*G01F 23/68* (2006.01)
*G05B 19/406* (2006.01)

(52) U.S. Cl.
CPC ......... *G05B 19/406* (2013.01); *G01F 23/363* (2013.01); *G01F 23/68* (2013.01); *G05B 2219/41301* (2013.01)

(58) Field of Classification Search
CPC ..... G01B 19/406; G01F 23/363; G01F 23/68; G01F 23/802; G05B 2219/41301; G05B 19/41845; Y02P 90/02; H04L 69/26
(Continued)

(56) References Cited

U.S. PATENT DOCUMENTS

| 2,041,997 | A | 5/1936 | Elfers |
| 5,455,763 | A | 10/1995 | Feingold |

(Continued)

FOREIGN PATENT DOCUMENTS

| CN | 105302171 A | 2/2016 |
| WO | WO-2014032547 A1 | 3/2014 |
| WO | WO-2014066947 A1 | 5/2014 |

OTHER PUBLICATIONS

Decision of Rejection issued in Chinese Patent Application No. 201410514702.1, dated Feb. 11, 2019.
(Continued)

*Primary Examiner* — Robert R Raevis
(74) *Attorney, Agent, or Firm* — MARSHALL, GERSTEIN & BORUN LLP

(57) ABSTRACT

Techniques that enable the installation of a level sensor capable of continuously detecting a level of fluid in a vessel or tank and capable of being integrated in a larger control system. Advantageously, the sensor head of the level sensor can be installed on existing installations with an existing displacer or float and an existing member or rod. The techniques thus enable process plants to easily and affordably replace pneumatic level sensors with a more environmentally friendly option.

20 Claims, 6 Drawing Sheets

(58) Field of Classification Search
USPC .................. 73/1.73, 305, 313, 314, 317–322
See application file for complete search history.

(56) References Cited

U.S. PATENT DOCUMENTS

| | | | |
|---|---|---|---|
| 5,544,000 | A | 8/1996 | Suzuki et al. |
| 6,201,701 | B1 | 3/2001 | Linden et al. |
| 6,721,609 | B1 | 4/2004 | Wojsznis et al. |
| 7,190,159 | B2 | 3/2007 | Galbreath et al. |
| 9,874,043 | B2 | 1/2018 | Zhang |
| 10,386,865 | B2 | 8/2019 | Cartwright et al. |
| 11,809,157 | B2 * | 11/2023 | Jensen .................. G01F 23/363 |
| 2002/0163089 | A1 | 11/2002 | La Crosse |
| 2006/0253204 | A1 | 11/2006 | Papanikolaou et al. |
| 2007/0005152 | A1 | 1/2007 | Karr et al. |
| 2007/0132779 | A1 | 6/2007 | Gilbert et al. |
| 2007/0163877 | A1 | 7/2007 | Brown et al. |
| 2008/0183310 | A1 | 7/2008 | Dykstra |
| 2009/0168908 | A1 | 7/2009 | Lee et al. |
| 2010/0006599 | A1 | 1/2010 | Cebulski |
| 2011/0080893 | A1 | 4/2011 | Fong et al. |
| 2012/0150517 | A1 | 6/2012 | Ray et al. |
| 2014/0062466 | A1 | 3/2014 | Thibault et al. |
| 2015/0034848 | A1 | 2/2015 | Penning et al. |
| 2016/0086471 | A1 | 3/2016 | Goldschmidt et al. |
| 2016/0123788 | A1 | 5/2016 | Farmanyan |
| 2021/0156726 | A1 | 5/2021 | Gebhard et al. |

OTHER PUBLICATIONS

International Preliminary Report on Patentability issued in PCT Patent Application No. PCT/US2014/058303 dated Apr. 14, 2016.
Notification of the Second Office Action issued in Chinese Patent Application No. 201410514702.1, dated Aug. 1, 2018.
Office Action issued in Chinese Patent Application No. 201410514702.1 dated Jan. 10, 2018.
Office Action issued in Russian Patent Application No. 2016114726 dated Aug. 21, 2018.
Written Opinion issued in PCT/US2014/058303 dated Jan. 20, 2015.
International Search Report for PCT/US2016/028582 dated Jul. 21, 2016.
Written Opinion for PCT/US2016/028582 dated Jul. 21, 2016.
Norriseal, "Operating and Maintenance Manual Series 1001, 1001A, 1001XL Level Control," Retrieved from the Internnet at: <https://www.norrisealwellmark.com/wp-content/uploads/2016/09/1001_Manual_2012-1.pdf> on Jun. 28, 2021.
Instruction Manual D103032X012, "Fisher™ L2 Liquid Level Controller," Retrieved from the Internet at: <https://www.emerson.com/documents/automation/instruction-manual-fisher-l2-liquid-level-controllers-en-135074.pdf> on Feb. 2020.

* cited by examiner

LEVEL SENSOR FOR CONTINUOUS LEVEL DETECTION AND INTEGRATION INTO PROCESS CONTROL SYSTEM

TECHNICAL FIELD

The present disclosure generally relates to level sensor technology, and more particularly, to techniques for implementing continuous level detection electromagnetic signaling of detect levels in a process control environment.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, typically are communicatively disposed between a controller and one or more field devices, enabling communications there between (e.g., by converting electrical signals into digital values and vice versa). Typically, an I/O card functions as an intermediary node between a process controller and one or more field devices inputs or outputs configured for the same communication protocol or protocols as those utilized by the I/O card. Specifically, field device inputs and outputs are typically configured for either analog or discrete communications. In order to communicate with a field device, a controller generally needs an I/O card configured for the same type of input or output utilized by the field device. That is, for a field device configured to receive analog control output signals (e.g., a 4-20 mA signal), the controller needs an analog output (AO) I/O card to transmit the appropriate analog control output signal; and for a field device configured to transmit measurements or other information via an analog signal, the controller typically needs an analog input (AI) card to receive the transmitted information. Similarly, for a field device configured to receive discrete control output signals, the controller needs a discrete output (DO) I/O card to transmit the appropriate discrete control output signal; and for a field device configured to transmit information via a discrete control input signal, the controller needs a discrete input (DI) I/O card.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system and Ovation™ distributed control system (DCS) sold by Emerson each includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object-oriented programming protocol that (i) perform functions within the control scheme based on inputs thereto and (ii) provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller (and, in some cases, one or more field devices) stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In addition to process controllers, I/O cards, and field devices, a typical process control system includes many other supporting devices which are also necessary for, or related to, process operation. These additional devices include, for example, power supply equipment, power generation and distribution equipment, rotating equipment such as turbines, etc., which are located at numerous places in a typical plant.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

The described methods and systems enable personnel at process control plants to convert existing level sensor or level controller installations from a pneumatic-signaling system to an electromagnetic-signaling system capable of continuous measurement of a fluid level.

In an embodiment, a level sensing system is configured for implementation in a process control environment. The level sensing system may comprise a level detection component (e.g., a displacer or a float) configured to rise or fall in response to changes in a level of liquid or fluid in which the level detection component is placed. The system may include a member (e.g., a rod or lever) that is mechanically linked to the level detection component such that the member changes position or orientation in response to the level detection component rising or falling (e.g., wherein the member is a lever that rotates around a pivot such that one end of the lever moves up and down in response to movement of the level detection component). In an embodiment, the member may include a magnetic array (e.g., disposed on an end of the member that moves up and down in response to the movement of the level detection component).

The level sensing system may include one or more sensors configured for continuous detection of the level of the liquid or fluid. For example, the sensors may be configured to continuously measure the position or orientation of the members. The sensors may be configured to generate a detected level value corresponding to the continuously measured position or orientation of the member. The sensors may be magnetic sensors (e.g., hall effect sensors) that detect a magnetic field emanating from magnets on the member mechanically linked to the level detection component. That is, in an embodiment, the sensors may be characterized as being "contactless" with regard to their relationship to the member and other mechanical components that move in response to the level detection component rising or falling. The level sensing system may include a circuit communicatively coupled to the one or more sensors that is configured to: (i) generate an electromagnetic signal (e.g., 4-20 mA, HART®, WirelessHart®, etc.), according to a process control communication standard or protocol, to carry the detected level value; and (ii) transmit the electromagnetic signal to a process controller to enable the process controller to implement control in light of the detected level value. In an embodiment, the sensors and circuit are disposed within a housing or body of a sensor head.

Note, this summary has been provided to introduce a selection of concepts further described below in the detailed description. As explained in the detailed description, certain embodiments may include features and advantages not described in this summary, and certain embodiments may omit one or more features or advantages described in this summary

DETAILED DESCRIPTION

Figure 1A:
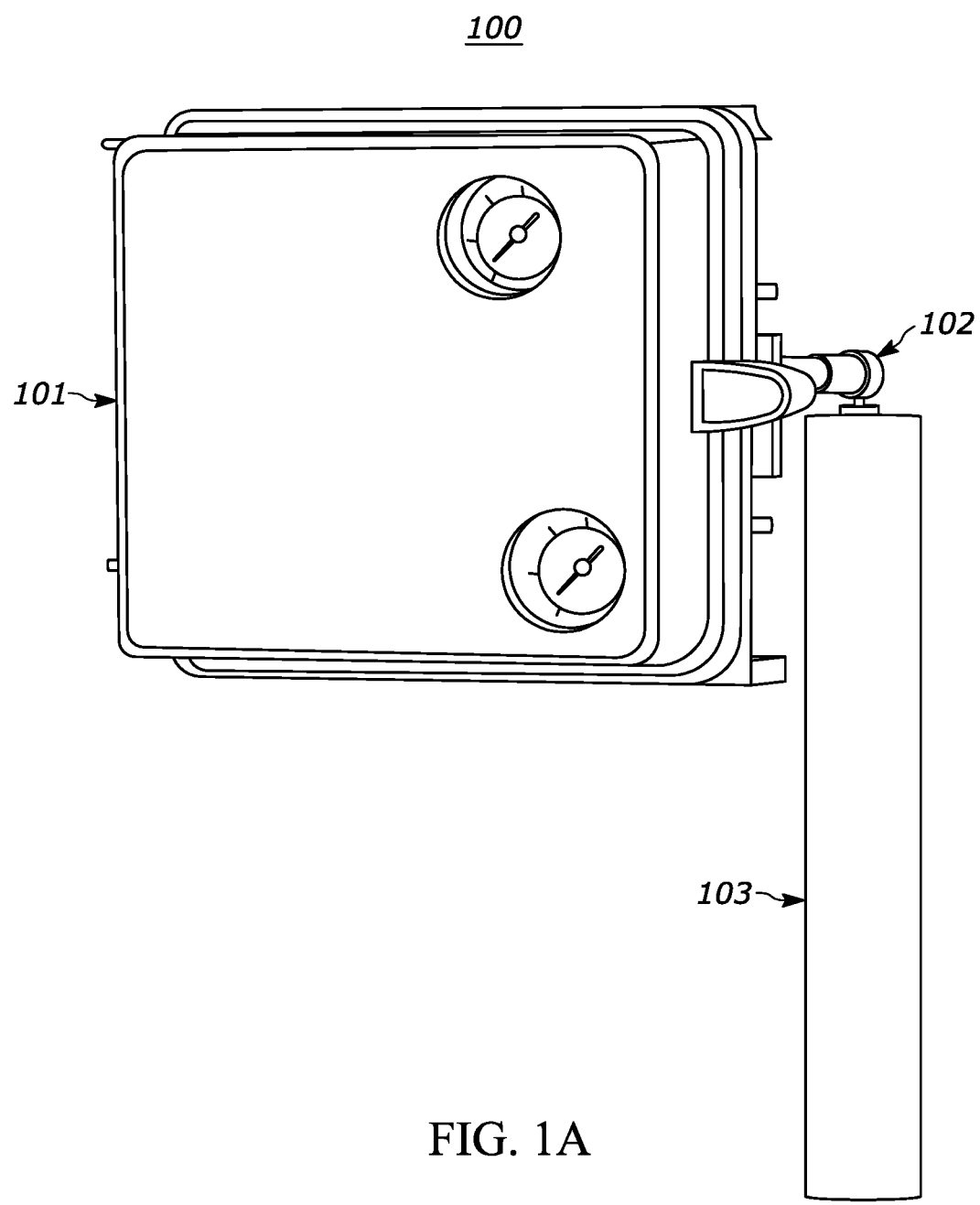
FIG. 1A depicts an example level sensor according to an embodiment.

The described methods and systems enable personnel at process control plants to convert existing level sensor or level controller installations from a pneumatic-signaling system to an electromagnetic-signaling system. FIG. 1A shows a level sensor 100 configured for electromagnetic signaling in accordance with the techniques described herein. In a typical example, the sensor 100 includes a displacer or float 103 that rises and falls with the rising and falling of a level of fluid in which it is placed. The displacer 103 is mechanically linked to a member or rod 102, which moves along a substantially vertical axis around a pivot in response to movement of the displacer 103. The pivot may be located roughly in the middle of the member 102. The other end of the rod 102 connects to one or more components within a housing of a sensor head 101 of the sensor 100.

At a high level, the phrase "sensor head" generally refers to the one or more components of a level sensor or level controller including the components that detect movement of a displacer (e.g., via a rod responsive to the displacer) and responsively generate a signal representing a level.

Further, at a high level, the phrase "continuous" level sensing refers to an operation in which a level is measured continuously or constantly (or near constantly). A continuous level sensor system may be thought of in contrast to a "point" level sensor system. Point level sensors are devices that detect the presence or absence of a liquid media. In an example system, a point level system may have a "low mark" sensor and a "high mark" sensor. The system is capable of detecting whether these sensors are active (and thus capable of detecting whether the marks have been exceeded). But such systems are not capable, for example, of detecting the precise level between the high or low marks. Further, if the level of the fluid is below the low level sensor, such a system cannot detect how low below the "low mark" the liquid is. Similarly, if the level of the fluid is above the "high mark," the system cannot detect how high above the "high mark" the level is. In a typical example, when the "high mark" sensor is triggered, it causes a pump to activate or a valve to open (thereby draining a tank so that the "high mark" is no longer exceeded). Similarly, in a typical example, when the "low mark" sensor is no longer triggered, the system closes the valve or shuts off the pump so that the level can begin rising again. Systems that utilize a displacer or float are often point level sensor systems. Notably, to the extent precise or exact level measurements are preferred or desired, point level sensors cannot provide such measurements. By contrast, a continuous level sensor provides a relatively constant measurement of liquid and delivers precise and accurate levels of the liquid within a tank or vessel at any time.

Generally speaking, the phrase "electromagnetic-signaling" and variations thereof refer to a technique for transmitting information via the manipulation of electromagnetic phenomena. For example, an electromagnetic signal may be an electric or electronic signal transmitted via a wired medium, wherein current, voltage, or frequency are manipulated in a manner to carry information. Example standards or protocols for electric or electronic signals that may be transmitted or received by the systems described herein include standard 4-20 mA signals used in process environments, HART, HART-IP, Fieldbus, Profibus, etc. As another example, an electromagnetic signal may be a wirelessly transmitted radio frequency (RF) signal, wherein amplitude, frequency, or phase shift is manipulated to carry information. An RF signal transmitted or received by the systems described herein may conform to one or more standards or protocols, such as Wi-Fi or other IEEE 802.11 compliant wireless local area network protocol(s), Bluetooth®, WirelessHART®, etc.

Returning to FIG. 1A, the sensor head 101 includes mechanical or electronic components configured to: (i) continuously detect the orientation or position of the rod 102, (ii) continuously analyze the detected orientation or position of the rod 102 to determine a level corresponding to the detected orientation or position of the rod at a given time, and (iii) generate and transmit (e.g., to a process controller) an electromagnetic signal representing the continuously detected or determined or measured level.

Generally speaking, the displacer 103 and the rod 102 may be components from a pneumatic sensor installation that existed prior to the installation of the sensor head 101. That is, in a typical example, a sensor head for pneumatic sensor components (not shown) may be removed, and the sensor head 101 may be installed in place of the old pneumatic sensor head.

Regarding pneumatic level sensors and controllers, in the process control industry, many pneumatic level control loops exist. These pneumatic control loops typically utilize a pneumatic displacement sensor and pneumatic control valve. In a typical example, the pneumatic level sensor and the pneumatic control valve (e.g., including a valve actuator and a valve positioner) are connected via a line carrying natural gas. The pneumatic level sensor transmits, via the natural gas line, a 3-15 psi pressure signal representing a detected level. The pneumatic positioner for the pneumatic control valve is configured to measure the pressure existing in the line and to actuate the valve based on the measured pressure. In a typical example, the pneumatic positioner is configured to actuate the valve in response to the measured pressure such that a desired range of levels is obtained (e.g., opening a discharge valve when a high fluid mark is reached to drop the level and closing the discharge valve when a low fluid mark is reached so that the level will increase). Typically, the pneumatic positioner controls the valve by similarly sending to the valve actuator a 3-15 psi pressure signal, which applies or relieves pressure on the valve actuator (e.g., thereby manipulating the degree to which a valve plug driven by the actuator obstructs or does not obstruct flow).

In any event, as noted, the sensor head 101 can be installed on existing displacers or floats for pneumatic installations, thereby creating the improved level sensor 100 capable of electromagnetic signaling. The sensor head 101 enables electromagnetic signaling in place of pneumatic signaling, as well as integration with a broader control system and control scheme (e.g., enabling remote monitoring and control).

Figure 1B:
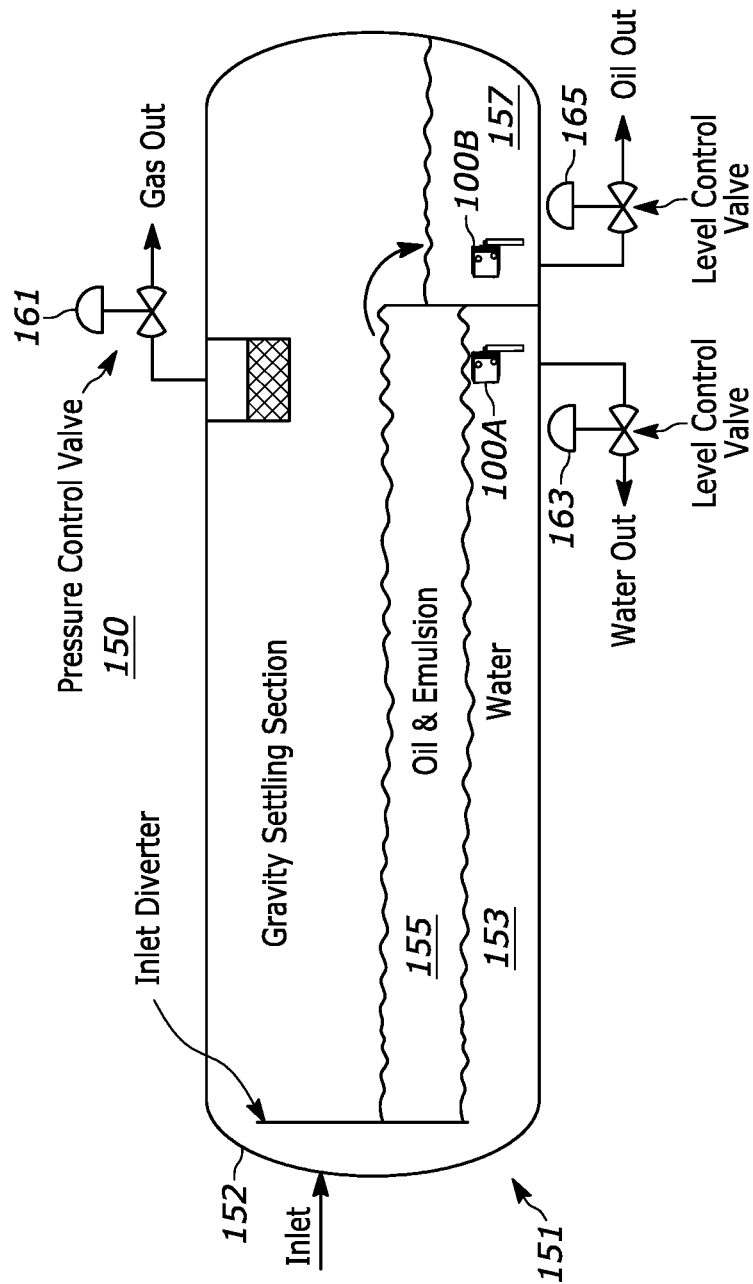
FIG. 1B depicts an example separator tank system in which level sensors, such as that shown in FIG. 1A, may be implemented.

FIG. 1B depicts an example system 150 in which example level sensors 100A and 100B, each representing embodiments of the level sensor 100 shown in FIG. 1A, may be implemented. The system 150 includes a separator tank 151, and an inlet 152 by which a fluid stream enters the tank 151. Generally speaking, a fluid stream enters the tank 151 from an oil or gas well. The system 150 is configured to separate water, oil, gas and sediment from the fluid stream that enters via the inlet 152. Typically, separator tank systems such as the system 150 include a level control system or loop that is designed to separate oil and water components, as well as a pressure regulator loop or system designed to manage pressure within the separator tank. Generally, there may exist two separate control loops with a separator. The first loop functions to remove water from the separator tank. For example, as shown, the level sensor 100A and a control valve 163 are associated with this first loop. The second loop functions to remove oil from the tank. As shown, the second loop includes the level sensor 100B and a control valve 165 tied to the oil component. In typical operation, the fluid stream enters the tank 152 and separates into a water portion 153 and an oil and emulsion portion 155. The sensor 100A is disposed such that it remains in the water portion 153 below the barrier between the water portion 153 and the oil portion 155. The oil portion 155 flows over a barrier into a second oil portion 157. The level sensor 100B is disposed in this oil portion 155 to measure the level of oil in the oil portion 155. The control valve 161 controls pressure maintained in the tank. This two-loop design for separator tanks carries the advantage of being relatively simple and easy to implement.

Unfortunately, a downside of typical separator tank systems is that they utilize pneumatic control loops. Typically, these systems were installed at locations that did not originally have an electric power source, often due to being located in remote locations where electric power was unavailable. These existing separator systems have become increasingly viewed as being unfriendly to the environment due to their use of natural gas for pneumatic signaling. Additionally, typical pneumatic signaling systems do not provide adequate feedback to operators who are located remotely from the well head because these systems are typically configured for local control only. That is, typical pneumatic control loops in these systems often operate independently of any larger control system. When issues arise in such systems, they typically require local maintenance and supervision. The inability to remotely monitor, control, or manipulate such systems carries numerous costs that are increasingly difficult to rationalize, particularly as infrastructure for power and networking capabilities has become increasingly easier and more affordable to install.

Compared to typical pneumatic installations, the level sensor 100 provides an environmentally friendly solution by enabling process plants to update or retrofit pneumatic level loops with the electromagnetic signaling level sensor 100. Advantageously, the sensor head 101 can be installed on existing installations with an existing displacer or float and an existing member or rod, enabling pressurized separation vessels (e.g., such as the tank 151 shown in FIG. 1B) to remain closed during installation. Among many benefits, this allows production downtime to be minimized and keeps employees safe as the vessel does not need to be depressurized to install the new sensor head 101. Additionally, the sensor head 101 may provide a greater level of diagnostics with regard to what is happening in the vessel (due to the "intelligent" electronic components included in the sensor head 101 and due to the fact that the sensor head 101 can be integrated into the larger control systems with controllers and computers capable of analyzing data collected via the sensor head 101). As noted, by contrast, traditional pneumatic designs do not provide adequate feedback to operators who are located remotely from the well head.

I. An Example Plant Environment

Figure 2:
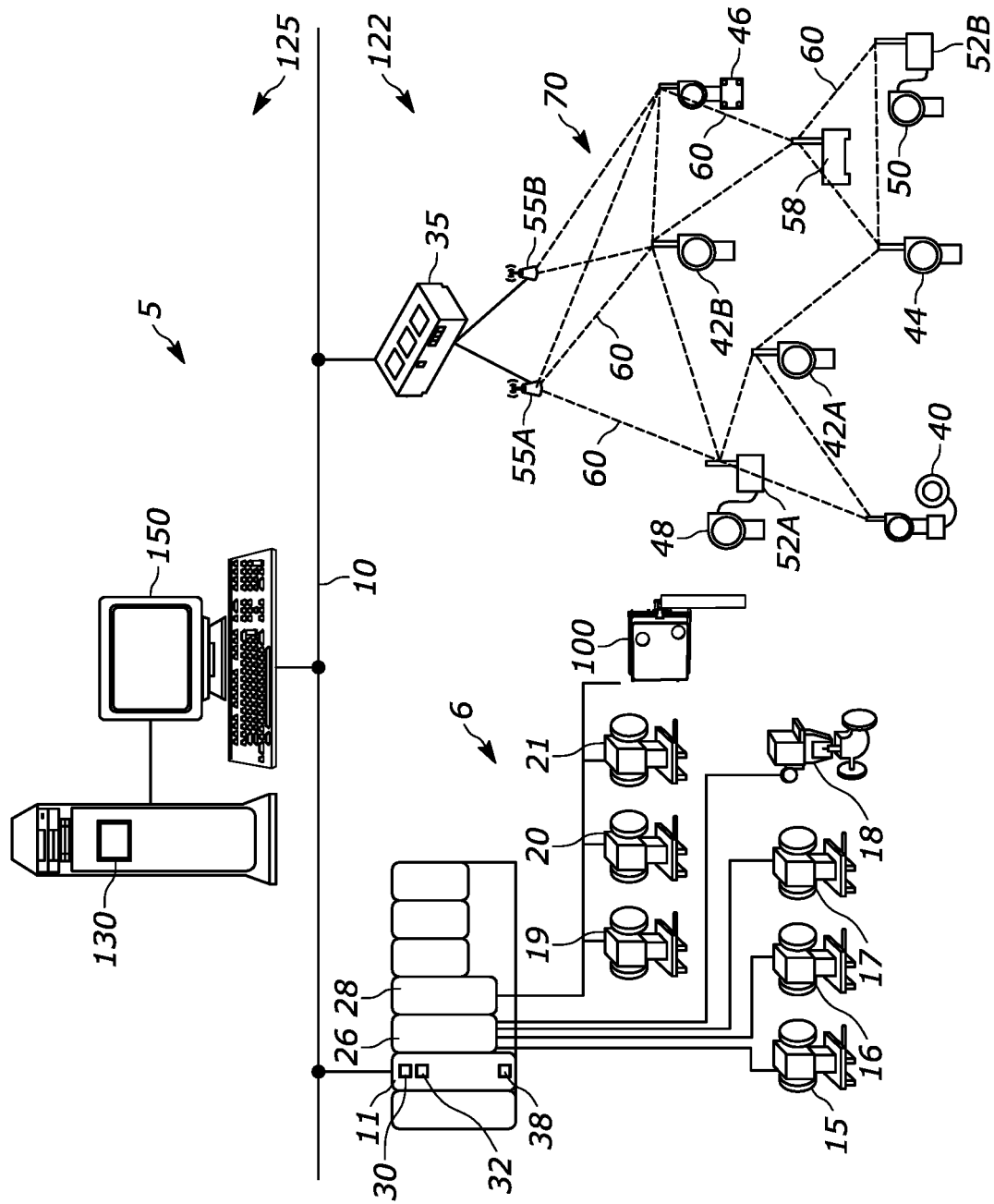
FIG. 2 is a block diagram of an example plant environment in which the level sensor, shown in FIG. 1, may be implemented.

FIG. 2 is a block diagram of an example process plant or environment 5 in which the level sensor 100 (also shown in FIG. 1A) may be implemented to obtain continuous level measurements. The process plant 5 controls a process that may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The process plant or control system 5 of FIG. 2 includes a field environment 122 (e.g., "the process plant floor 122") and a back-end environment 125, each of which is communicatively connected by a process control backbone or data highway 10. The backbone 10 (sometimes referred to as the "link 10" or "network 10") may include one or more wired or wireless communication links, and may be implemented using any desired or suitable communication protocol, such as an Ethernet protocol.

Generally speaking, as used herein and unless otherwise specified, the term "network" refers to a collection of nodes (e.g., devices or systems capable of sending, receiving or forwarding information) and links which are connected to enable telecommunication between the nodes. Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

At a high level (and as shown in FIG. 2), the field environment 122 includes physical components (e.g., process control devices, networks, network elements, etc.) that are disposed, installed, and interconnected to operate to control the process during run-time. For example, the field environment 122 includes an I/O network 6. By and large, the components of the I/O network 6 are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote. If desired, any component in the back-end environment 125 may receive data generated or transmitted by the level sensor 100.

As noted, the field environment 122 includes one or more I/O networks such as the I/O network 6, each of which includes: (i) one or more controllers, (ii) one or more field devices communicatively connected to the one or more controllers, and (iii) one or more intermediary nodes (e.g., I/O cards or modules) facilitating communication between the controllers and the field devices. As shown, the I/O network 6 may include the level sensor 100, which may be communicatively linked to the process controller 11 via an I/O card 26 or 28.

Generally, at least one field device performs a physical function (e.g., opening or closing a valve, increasing or decreasing a temperature, taking a measurement, sensing a condition, etc.) to control the operation of a process implemented in the process plant 5. The field devices may be thought of as a means to manipulate a process input (e.g., a valve position or pump status) or to measure a process output (e.g., a tank level, a flow speed, a pressure, a temperature, a temperature, etc.). For example, the level sensor 100 is configured to obtain continuous level measurements, which may then be provided to any one or more nodes in the I/O network 6 or in the plant network 5.

Some types of field devices communicate with controllers via I/O devices (sometimes called "I/O cards"). Process controllers, field devices, and I/O cards may be configured for wired or wireless communication. Any number and combination of wired and wireless process controllers, field devices, and I/O devices may be included in the process plant environment or system 5. For example, the field environment 122 includes the I/O network 6, which includes a process controller 11 communicatively connected, via an I/O card 26 and an I/O card 28, to a set of wired field devices 15-22. If desired, the level sensor 100 may be communicatively linked to the process controller 11 via an I/O card such as the I/O card 26 or 28.

The field environment 122 also includes a wireless network 70 including a set of wireless field devices 40-46 coupled to the controller 11 (e.g., via a wireless gateway 35 and the network 10). The wireless network 70 may be a part of the I/O network 6, or may be a part of an I/O network not shown in FIG. 2 (and may include controllers or I/O cards not shown in FIG. 2). In some implementations, the sensor head 101 of the level sensor 100 may include circuitry capable of wirelessly receiving or transmitting any of the data described herein as being transmitted or received by the level sensor 100. This data may be transmitted or received via any suitable wireless protocol (e.g., WirelessHart®, Bluetooth®, WiFi, etc.). If desired, the sensor head 101 may be configured to communicate via a wired link, but may be linked to an external wireless transceiver or adapter that gives the level sensor wireless capability.

In some configurations, the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be the DeltaV™ controller sold by Emerson Process Management, may operate to implement a batch process or a continuous process using at least some of the field devices 15-22 and 40-46. In addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 2, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. Note, any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object-oriented programming, ladder logic, sequential function charts, function block diagrams, or using any other software programming language or design paradigm. The control routines 38 may be stored in any desired type of memory 32, such as random-access memory (RAM), or read only memory (ROM). Likewise, the control routines 38 may be hard-coded into, for example, one or more EPROMs, EEPROMs, application specific integrated circuits (ASICs), or any other hardware or firmware elements. Put simply, the controller 11 may be configured to implement a control strategy or control routine in any desired manner.

The controller 11 implements a control strategy using what are commonly referred to as function blocks, where each function block is an object or other part (e.g., a subroutine) of an overall control routine. The controller 11 may operate in conjunction with function blocks implemented by other devices (e.g., other controllers or field devices) to implement process control loops within the process control system 5. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

If desired, the controller 11 may be configured to control one or more valves and/or one or more pumps based on data received from the level sensor 100. For example, one or more discharge pumps may be activated and/or one or more discharge valves may be opened when a level is approaching an undesired level deemed to be too high. Similarly, in such a situation, one or more inlet valves or pumps may be closed or deactivated to halt inflow into a tank when the level reaches a threshold or approaches a threshold. Conversely, when a level reaches an undesirably low level, one or more discharge pumps or valves may be deactivated or closed, respectively, to decrease outflow. Likewise, one or more inlet pumps or valves may be activated or opened, respectively, to increase inflow.

In any event, the wired field devices 15-22 may be any types of devices, such as sensors, valves, transmitters, positioners, etc., while the I/O cards 26 and 28 may be any types of process control I/O devices conforming to any desired communication or controller protocol. In FIG. 2, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. Additionally or alternatively, in some embodiments at least some of the wired field devices 15-22 or at least some of the I/O cards 26, 28 communicate with the controller 11 using the process control data highway 10 or by using other suitable control system protocols (e.g., Profibus, DeviceNet, FOUNDATION® Fieldbus, ControlNet, Modbus, HART®, etc.).

In FIG. 2, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 2, a field device 48 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART®, and may also support one or more other communication protocols such as Foundation® Fieldbus, PROFIBUS, DeviceNet, etc. If desired, the level sensor 100 may be coupled to the wireless network 70 (and, e.g., a controller) via an adapter such as the adapters 52a/b).

Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 2, the wireless devices 40-46 and 52-58 communicate with each other and with the wireless gateway 35 over wireless links 60 of the wireless communications network 70, or via the process control data highway 10.

As noted, the back-end environment 125 may include various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more operator workstation(s) (e.g., configured to display, to an operator, data from the level sensor 100; or configured to enable the operator to transmit a command to the level sensor 100); (ii) a configuration application and a configuration database (e.g., to enable configuration of the level sensor 100); (iii) a data historian application and a data historian database (e.g., to store historical information from the level sensor 100, such as measured levels or diagnostic information generated by the level sensor 100); (iv) one or more other wireless access points that communicate with other devices using other wireless protocols; and (v) one or more gateways to systems external to the immediate process control system 5.

As shown, the plant 5 may include a diagnostics system 130, which may execute on a host (sometimes referred to as a "server," "computer," etc.) 150 and may be communicatively coupled to the data highway 10. The host 150 may be any suitable computing device, and may include a memory (not shown) storing the system 130 as one or more modules, applications, or sets of instructions; and a processor (not shown) to execute the system 130. The memory may be any system or device including non-transitory computer readable media for placing, keeping, and/or receiving information (e.g., RAM, ROM, EEPROM, flash memory, optical disc storage, magnetic storage, etc.). In some configurations, the host 150 may be a portable handheld tool, including a touch interface, for example. Further, in some instances, the system 130 is an application-specific integrated circuit (ASIC). While FIG. 2 shows the host 150 as including a display, in some instances the host 150 does not include a display. In any event, the diagnostics system 130 may perform diagnostic analysis on data received from the level sensor 100.

II. Example Aspects of Example Level Sensors

Figure 3:
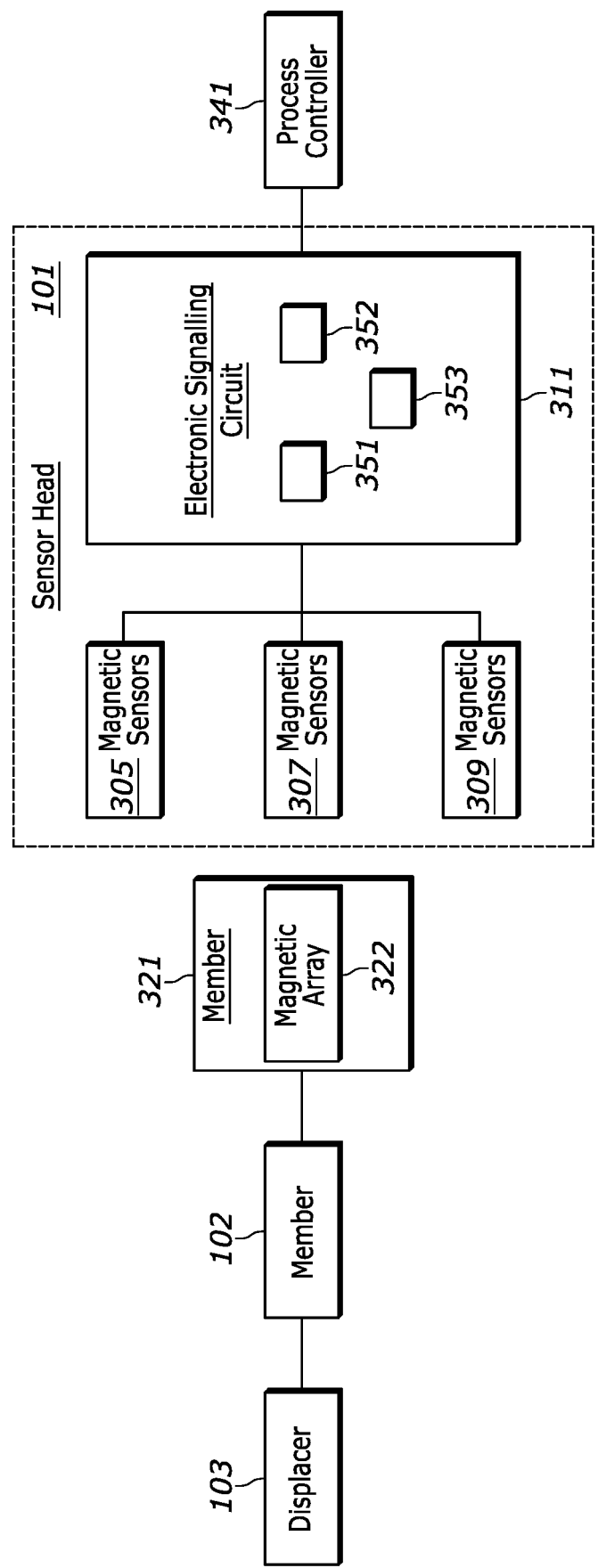
FIG. 3 is a block diagram depicting example components of a level sensor such as the one shown in FIG. 1.

FIG. 3 is a block diagram of the sensor head 101 (also shown in FIG. 1A), according to an embodiment. FIG. 3 also depicts the displacer 103 and the member 102 shown in FIG. 1A, according to an embodiment, as well as a process controller 341 that may be communicatively coupled to the level sensor 100 via the sensor head 101. The process controller 341 may be similar to the process controller 311 shown in FIG. 1.

In operation, the member or rod 102 of the embodiment 300 moves (e.g., in a substantially vertical direction), causing a linked member 321 to responsively move or change orientation (e.g., along a substantially vertical axis). In the shown example, the member 321 includes a magnetic array 322. The magnetic array may include any suitable number or arrangement of magnetics sufficient to enable operation of the sensor head 101.

The sensor head 101 may include magnetic sensors 305, 307, and 309, as well as an electromagnetic signaling circuit 311 that is electrically and/or communicatively connected to the magnetic sensors 305-309.

The electromagnetic signaling circuit 311 may include, among other components, a processor 351, memory 352, input/output (I/O) and/or network interface(s) 353, all of which may be interconnected via an address/data bus (not shown). The memory 352 may store software and/or machine-readable instructions that may be executed by the processor 351. It should be appreciated that although FIG. 3 depicts only one processor 351, the circuit 311 may include multiple processors 351. The processor 351 of the illustrated example is hardware, and may be a semiconductor based (e.g., silicon based) device. Example processors 351 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc.

The memory 352 may include volatile and/or non-volatile memory(-ies) storing software and/or machine-readable instructions. For example, the program memory 352 may store software and/or machine-readable instructions that may be executed by the processor 351 to: (i) determine a level of fluid corresponding to output received from the magnetic sensors 305-309 (e.g., representing a detected magnetic field), and (ii) generate and/or transmit a signal to carry the determined level to another device (e.g., the controller 341 or 11). As used herein, the term non-transitory, machine-readable medium is expressly defined to include any type of machine-readable storage device and/or storage disk, to exclude propagating signals, and to exclude transmission media.

The circuit 311 may include one or more input/output (I/O) and/or network interfaces, referred to collectively as the communication interface 353. The communication interface(s) 353 of the circuit 311 enables the level sensor 100 to communicate with, for example, another device, system, host system, or any other machine such as the process controller 341, the controller 11 shown in FIG. 2, or the host 150 shown in FIG. 2.

If desired, the interface 353 may include an I/O interface enabling the receipt of user input and communication of output data to, for example, a user 156. Such an I/O interfaces may include any number and/or type(s) of different types of I/O circuits or components that enable the processor 351 to communicate with peripheral I/O devices (e.g., the example sensors 305-309) or another system. Example I/O interfaces include a universal serial bus (USB) interface, a Bluetooth® interface, a near field communication (NFC) interface, a serial interface, and/or an infrared transceiver. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a speaker, a microphone, a printer, a button, etc. Although FIG. 3 depicts the interface(s) 353 as a single block, the I/O interface(s) 353 may include any number and/or type(s) of circuits or components that enable the processor 351 to communicate with peripheral I/O devices and/or other systems.

Further, the interface(s) 353 may enable communication with other systems (e.g., the process controller 341, the controller 11 shown in FIG. 2, or the host 150 shown in FIG. 2) via, for example, one or more networks (e.g., the networks 10 or 70). The example interface(s) 353 may include any suitable type of wired and/or wireless network interface(s) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a coaxial cable modem, or any other suitable communication protocols or standards. Again, although FIG. 3 depicts the interface(s) 353 as a single block, the interface(s) 353 may include any number and/or type(s) of network interfaces that enable the processor 351 to communicate with other systems and/or networks.

In any event, the magnetic sensors 305-309 may be hall effect sensors capable of detecting magnetic field(s) emanating from the magnetic array 322. In a typical example, the magnetic sensors 305-309 output a voltage directly proportional to a detected magnetic field strength. The sensors 305-309 may operate as an analog transducer. With a known magnetic field, a distance between the sensors 305-309 and the magnetic array 322 can be determined. If desired, the magnetic sensors 305-309 can be disposed and configured such that a relative position of the magnets 322 can be deduced. Due to the ability of the magnetic sensors 305-309 to provide an output (e.g., a voltage) from which a relative distance and/or position of the magnetic array 322 can be determined, the magnetic sensors 305-309 enable continuous level sensing based on the detected distance/position of the magnets (e.g., as opposed to point sensing).

Upon detecting a distance/position of the magnetic array 322 (e.g., based on a voltage from the sensors 305-309), the circuit 311 may determine a corresponding level. The circuit 311 may, for example, store to memory a table correlating outputs from the magnetic sensors 305-309 to known levels. If desired, the circuit 311 may interpolate between these relationships when, for example, a sensor output is detected but not found in such a table, to determine a detected level. The levels that correspond to detected outputs from the sensors may be set during a configuration process. In any event, after determining the level, the circuit 311 may output a signal to a process controller 341 (which may be similar to the controller 11 shown in FIG. 2) conforming to a process control protocol (e.g., 4-20 mA) carrying the detected level. For example, a signal may be configured such that an 8 mA signal represents a 0% level and a 16 mA signal represents a level of 100%. Current levels between 8 mA and 16 mA may proportionately represent levels between 0-100% (e.g., such that 12 mA represents a level of 50%). In some instances, the signal may be scale to a direct measurement rather than a percent (e.g., indicating the tank is at a level of four feet).

Figure 4:
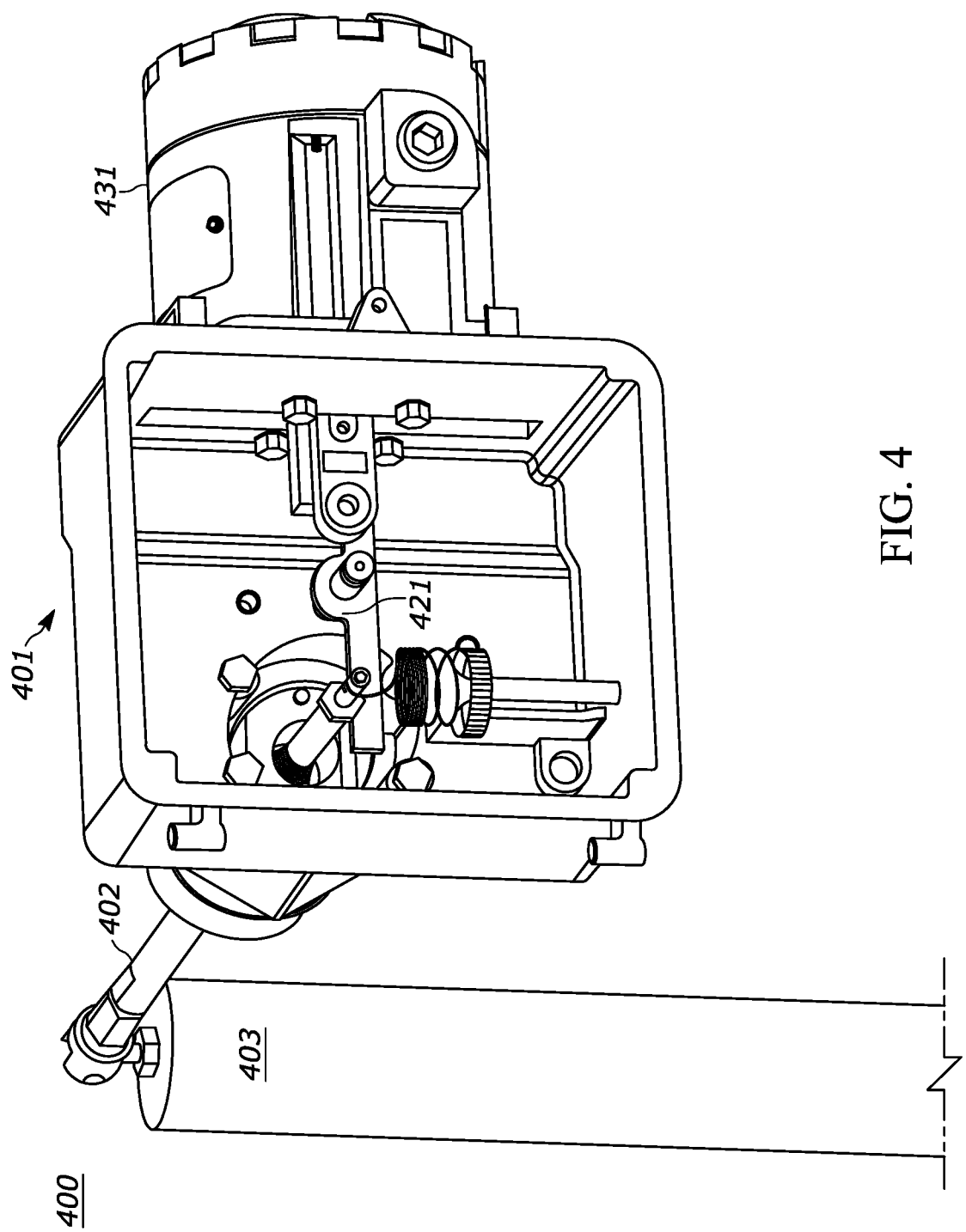
FIG. 4 is a cutaway illustration of an example level sensor, such as the one shown in FIG. 1.

FIG. 4 is a cutaway illustration of an example embodiment 400 of the level sensor 100. As shown, the sensor 400 includes a displacer or float 403 (e.g., similar to the displacer 103), a member or rod 402 (e.g., similar to the road 102), and a sensor head 401 (e.g., similar to the sensor head 101). The rod 402 may be mechanically linked to a lever 421 (e.g., similar to the member 321 shown in FIG. 3) such that movement of the rod 402 (e.g., along a substantially vertical axis) causes the lever 421 to move. Specifically, movement of the rod 402 may cause the lever 421 to rotate around a pivot. One end of the lever 421 may include a magnetic array (e.g., such as the array 322 shown in FIG. 3). The sensor head 401 may include a communication module 431 housing a circuit such as the electromagnetic signaling circuit 411, enabling the movement of the member 421 to be continuously detected, thereby enabling continuous detection of the displacer 403 and continuous electromagnetic signaling of the detected level.

Figure 5:
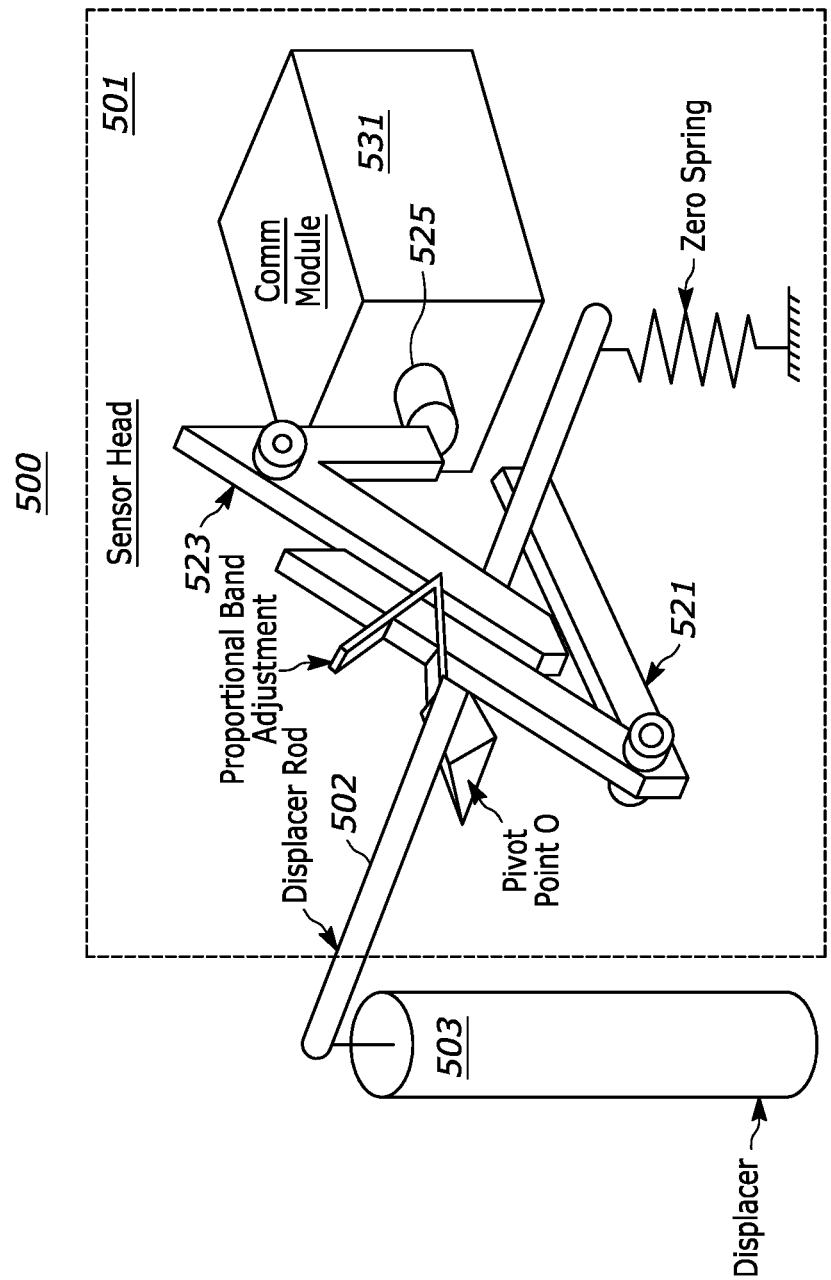
FIG. 5 depicts an example level sensor according to an embodiment.

FIG. 5 depicts an example embodiment 500 of the level sensor 100. Compared to the embodiment 400, the embodiment 500 represents a variation in how movement of a displacer or float may be detected and translated to an electromagnetic signal. The embodiment 500 may include a displacer 503 (e.g., similar to the displacer 103), a rod 502 (e.g., similar to the rod 102), and a sensor head 501. The sensor head 501 may include a communication module 531 similar to the communication module 431 shown in FIG. 4.

As shown, movement of the rod 502 along a substantially vertical axis may cause the members 521 and 523 to move in a substantially vertical direction in response to the rod 502 moving. The member 523 may be mechanically linked to a rotating component 525, which rotates in response to the member 523 moving up and down. The component 525 may have a magnetic array (e.g., positioned on one half of the component 525). In a manner similar to that described with reference to FIG. 3, the communication module 531 may detect the magnetic array as it moves through a range of motion, enabling the module 531 to determine a level measurement corresponding to the rotational position of the component 525. The communication module 531 may transmit the obtained measurement to a process control such as the controller 11 shown in FIG. 2 or the controller 341 shown in FIG. 3.

III. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

What is claimed is:

1. A level sensing system configured for implementation in a process control environment, the level sensing system comprising:
   a level detection component configured to rise or fall in response to changes in a level of liquid in which the level detection component is placed;
   a linking member that is mechanically linked to the level detection component such that the linking member changes position or orientation in response to the rise or fall of the level detection component;
   one or more sensors configured for continuous detection of the level of liquid by way of: (i) continuously measuring the position or orientation of the linking member, and (ii) generating a detected level value corresponding to the continuously measured position or orientation of the linking member;
   a circuit communicatively coupled to the one or more sensors and configured to: (i) generate an electromagnetic signal, according to a process control communication standard, to carry the detected level value; and (ii) transmit the electromagnetic signal to a process controller to enable the process controller to implement control in light of the detected level value; and
   a spring configured to exert a force on the linking member.

2. The system of claim 1, wherein the level detection component is a displacer.

3. The system of claim 1, wherein the level detection component is a float.

4. The system of claim 1, wherein the linking member comprises a rod mechanically linked to the level detection component, the level sensing system further comprising a lever, and the lever including: (i) a first end mechanically linked to the rod; (ii) a pivot point around which the lever rotates in response to the rod exerting a force on the first end; and (iii) a second end including the one or more sensors.

5. The system of claim 4, wherein the spring is configured to exert a downward force on the rod to thereby cause the first end of the lever to exert an upward force on the rod for the purpose of maintaining contact between the first end of the lever and the rod.

6. The system of claim 1, wherein the spring is configured to exert a downward force on the linking member.

7. The system of claim 1, wherein each of the one or more sensors is a force sensor configured to continuously measure force conveyed by the linking member on a respective sensor of the one or more sensors.

8. The system of claim 1, wherein the process control communication standard is a 4-20 mA current signaling standard and wherein the electromagnetic signal is a 4-20 mA signal.

9. The system of claim 1, wherein the process control communication standard is the HART standard and wherein the electromagnetic signal is a digital signal superimposed on a 4-20 mA signal.

10. The system of claim 1, wherein the process control communication standard is the Fieldbus standard.

11. A level sensing system configured for implementation in a process control environment, the level sensing system comprising:
    a level detection component configured to rise or fall in response to changes in a level of liquid in which the level detection component is placed; and
    a sensor head, comprising:
        a linking member that is mechanically linked to the level detection component such that the linking member changes position or orientation in response to the rise or fall of the level detection component;
        one or more sensors configured for continuous detection of the level of liquid by way of: (i) continuously measuring the position or orientation of the linking member, and (ii) generating a detected level value corresponding to the continuously measured position or orientation of the linking member;
        a circuit communicatively coupled to the one or more sensors and configured to: (i) generate an electromagnetic signal, according to a process control communication standard, to carry the detected level value; and (ii) transmit the electromagnetic signal to a process controller to enable the process controller to implement control in light of the detected level value; and
        a spring configured to exert a force on the linking member.

12. The level sensing system of claim 11, wherein the sensor head includes a housing, wherein the linking member is at least partially disposed in the housing, and wherein the one or more sensors and the circuit are entirely disposed in the housing.

13. The system of claim 11, wherein the linking member comprises a rod mechanically linked to the level detection component, the level sensing system further comprising a lever, the lever including: (i) a first end mechanically linked to the rod; (ii) a pivot point around which the lever rotates in response to the rod exerting a force on the first end; and (iii) a second end including the one or more sensors.

14. The system of claim 13, Previously Presented wherein the spring is configured to exert a downward force on the rod to thereby cause the first end of the lever to exert an upward force on the rod for the purpose of maintaining contact between the first end of the lever and the rod.

15. The system of claim 11, wherein each of the one or more sensors is a force sensor configured to continuously measure force conveyed by the linking member on a respective sensor of the one or more sensors.

16. A method of controlling a process control system in a process control environment, the method comprising:
    mechanically linking a linking member to a level detection component such that the linking member changes position or orientation in response to the level detection component rising or falling, wherein the level detection component is configured to rise or fall in response to changes in a level of liquid in which the level detection component is placed;
    continuously measuring, via one or more sensors, the position or orientation of the member;
    generating, by the one or more sensors, a detected level value corresponding to the continuously measured position or orientation of the linking member;
    generating, via circuit communicatively coupled to the one or more sensors, an electromagnetic signal, according to a process control communication standard, to carry the detected level value; and
    transmitting, via the circuit, the electromagnetic signal to a process controller to enable the process controller to implement control in light of the detected level value,
    wherein a spring is configured to exert a force on the linking member.

17. The method of claim 16, wherein each of the one or more sensors is a force sensor configured to detect a force conveyed by the linking member on a respective sensor of the one or more sensors.

18. The method of claim 16, wherein the process control communication standard is a 4-20 mA current signaling standard and wherein the electromagnetic signal is a 4-20 mA signal.

19. The method of claim 16, wherein the process control communication standard is the HART protocol.

20. The method of claim 16, wherein the detected level value is a percentage value on a scale of 0%-100%.

* * * * *